United States Patent

Shimura et al.

(10) Patent No.: US 6,516,081 B1
(45) Date of Patent: *Feb. 4, 2003

(54) METHOD OF AND SYSTEM FOR PROCESSING RADIATION IMAGE, UTILIZING PROSPECTIVE IRRADIATION FIELD INFORMATION

(75) Inventors: Kazuo Shimura, Kanagawa-ken (JP); Hideya Takeo, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,059

(22) Filed: Sep. 30, 1997

(30) Foreign Application Priority Data

Sep. 30, 1996 (JP) .............................. 8-257979
Apr. 14, 1997 (JP) .............................. 9-095621

(51) Int. Cl.⁷ .................................................. G06K 9/00
(52) U.S. Cl. ................... 382/128; 382/132; 250/492.1; 250/584
(58) Field of Search ................................ 382/128, 264, 382/132, 190; 250/586, 337, 587, 582, 584, 492.1, 370.09, 370.11; 358/447

(56) References Cited

U.S. PATENT DOCUMENTS

| 3,859,527 A | * | 1/1975 | Luckey | 250/327 |
|---|---|---|---|---|
| 4,276,473 A | * | 6/1981 | Kato et al. | 250/587 |
| 4,315,318 A | * | 2/1982 | Kato et al. | 382/264 |
| 4,939,367 A | * | 7/1990 | Adachi | 250/327.2 |
| 4,952,805 A | * | 8/1990 | Tanaka | 250/586 |
| 4,967,079 A | | 10/1990 | Shimura | 250/586 |
| 5,051,587 A | * | 9/1991 | Hara et al. | 250/327.2 |
| 5,068,907 A | | 11/1991 | Takeo | 382/48 |
| 5,404,024 A | * | 4/1995 | Namiki | 250/250 |
| 5,553,159 A | * | 9/1996 | Takeo | 382/156 |
| 5,668,889 A | * | 9/1997 | Hara | 382/128 |
| 5,732,149 A | * | 3/1998 | Kido et al. | 382/128 |
| 5,883,972 A | * | 3/1999 | Ito | 382/132 |

FOREIGN PATENT DOCUMENTS

| JP | 01050173 | * | 2/1989 | |
| JP | 3-98174 | | 4/1991 | G06F/15/68 |

* cited by examiner

Primary Examiner—Bhavesh Mehta
Assistant Examiner—Sheela Chawan
(74) Attorney, Agent, or Firm—Sughrue Mion, PLLC (57) ABSTRACT

When processing a radiation image, an image signal representing a radiation image and a prospective irradiation field information representing a prospective irradiation field of the radiation image are obtained in an image information obtaining section. The prospective irradiation field information is transferred to an image output section attached to the radiation image signal or separately therefrom. An image processing to make the image in the prospective irradiation field more suitable for viewing on the transferred image signal is carried out in the image output section on the basis of the transferred prospective irradiation field information, and a radiation image is output on the basis of the processed image signal.

16 Claims, 6 Drawing Sheets

METHOD OF AND SYSTEM FOR PROCESSING RADIATION IMAGE, UTILIZING PROSPECTIVE IRRADIATION FIELD INFORMATION

BACKGROUND OF THE INVENTION

1. Field of the Invention

This invention relates to a method of and system for processing a radiation image and more particularly to a method of and system for processing a radiation image which is taken using an irradiation field stop.

2. Description of the Related Art

It has been put into practice to photoelectrically read out a radiation image recorded on a radiograph film thereby obtaining an image signal representing the radiation image, carry out an adequate image processing on the image signal and output the processed image signal to a CRT, a laser printer or the like. Further there has been known a radiation image recording and reproducing system in which a medical radiation image such as of a human body is stored on a stimulable phosphor sheet, the stimulable phosphor sheet is then exposed to stimulating rays such as a laser beam which cause the stimulable phosphor sheet to emit light in proportion to the stored radiation energy, the light emitted from the stimulable phosphor sheet is photoelectrically detected and converted to an electric image signal, and the radiation image of the object is reproduced as a visible image on the basis of the electric image signal.

In such a radiation image recording and reproducing system, the recording system, read-out system, image processing system, CRT, laser printer and the like are not always installed in one location in a hospital but are often in separate locations and connected with each other by a network. Further, an image signal representing a radiation image recorded in a big hospital is sometimes transferred to a remote hospital without a large equipment such as a recording system through a network and a visible image is reproduced on a CRT in the hospital for diagnosis.

In order to minimize the irradiation dose to the object, a radiation image is sometimes recorded using an irradiation field stop so that only a necessary portion of the object is exposed to the radiation. The image signal representing a radiation image taken using an irradiation field stop is sometimes subjected to an image processing so that the image in the irradiation field becomes more suitable for diagnosis. See, for instance, Japanese Unexamined Patent Publication No. 3(1991)-98174. For example, when a radiation image taken using an irradiation field stop is reproduced on a CRT as it is, the area outside the irradiation field is reproduced at a high brightness on the CRT, which makes it hard to see the image. Accordingly the image signal is sometimes subjected to an image processing for lowering the brightness of the area outside the irradiation field. This processing is equivalent to a processing for increasing the density of the area outside the irradiation field in film output. (Such processings will be referred to as "off-field darkening processing", hereinbelow.)

When transferring an image signal to a CRT or the like through a network, necessary image processings are generally carried out on the image signal before transfer in order to lighten the load on the system to which the image signal is to be transferred and the network, so that only the smallest necessary image signal, that is, the processed image signal is transmitted. It is true also for the image processing for making the area in the irradiation field to easy to see. That is, an irradiation field recognition processing is first carried out on an original image signal, thereby obtaining irradiation field information for distinguishing the area inside the irradiation field from the area outside the same (information representing the irradiation field or information representing the edge of the irradiation field, i.e., the boundary between the area inside the irradiation field and the area outside the irradiation field), for instance, an off-field darkening processing is carried out on the original image signal on the basis of the irradiation field information, and then the processed image signal is transferred to the output system such as a CRT, a laser printer or the like through a network.

Generally in the image processing system using a network, when the receiver side cannot obtain a normal image signal due to abnormality on the transmitter side, the transmitter side tries again the step where the abnormality occurred and transmits again the normal image signal.

However in the case where abnormality occurs in a processing for recognizing an irradiation field (e.g., an automatic prospective irradiation field recognition processing) and a part of the image is made invisible due to the abnormality, e.g., darkened though the image signal itself is normal, it is sometimes preferred that the image be made visible at once by cancelling the processing, even if the image becomes somewhat difficult to view, rather than repeating the processing taking a long time.

Further, there is a case where it is preferred that the irradiation field be corrected on the receiver side and the image processing be carried out on the basis of the corrected irradiation field.

SUMMARY OF THE INVENTION

In view of the foregoing observations and description, the primary object of the present invention is to provide a method of and a system for processing a radiation image in which an image output on the receiver side with an area considered to be outside a prospective irradiation field can be processed in a predetermined way and changed with the prospective irradiation field or cancelled with the processing in a short time.

In accordance with the present invention, an irradiation field recognition processing for recognizing a prospective irradiation field which is considered to be an irradiation field of a radiation image is carried out in an image information obtaining section, which is an image signal transmitter, and the information on the prospective irradiation field is transferred to an image output section, which is an image signal receiver, attached to a radiation image signal representing the radiation image or separately therefrom, and the image processing is carried out on the basis of the transferred information on the prospective irradiation field in the image output section.

That is, in accordance with a first aspect of the present invention, there is provided a method of processing a radiation image comprising the steps of obtaining an image signal representing a radiation image and a prospective irradiation field information representing a prospective irradiation field of the radiation image, transferring the prospective irradiation field information attached to the radiation image signal or separately therefrom to an image output section, carrying out an image processing to make the image in the prospective irradiation field more suitable for viewing on the transferred image signal in the image output section on the basis of the prospective irradiation field information transferred, and outputting a radiation image on the basis of the processed image signal.

The prospective irradiation field information may be obtained by various methods. For example, the prospective irradiation field information may be obtained by carrying out an automatic recognition processing on the image signal according to a predetermined algorithm as disclosed in U.S. Pat. Nos. 4,967,079 and 5,068,907 and and the like, or may be obtained by the operator designating a prospective irradiation field using an input means such as a mouse, a touch pen or the like viewing a radiation image displayed on a monitor.

As a method of automatically detecting a prospective irradiation field by carrying out a processing according to a predetermined algorithm, various known irradiation field recognition processings may be applied. For example, a dynamic contour extraction processing using Snakes algorithm may be employed as well as a processing in which prospective edge points are detected on the basis of differences between image signal components and a prospective edge is detected on the basis of the prospective edge points.

The term "prospective irradiation field" means an area which is considered to be an irradiation field in the recognition processing. That is, depending on the accuracy of the processing or input accuracy of the operator, the detected irradiation field cannot always precisely coincide with the real irradiation field existing in the radiation image (including a case where no irradiation field exists in the radiation image). Accordingly, in this specification, an area recognized as an irradiation field is referred to as "prospective irradiation field" in order to distinguish from the real irradiation field.

The expression "transferring the prospective irradiation field information attached to the radiation image signal" means, for instance, determining a data format including the radiation image signal and the prospective irradiation field information and preparing and transferring the transferred data according to the data format, or transferring the prospective irradiation field information incorporated in header information. Otherwise the prospective irradiation field information may be incorporated in the radiation image signal as a part thereof and the radiation image signal and the prospective irradiation field information may be transferred as one radiation image signal. For example, the prospective irradiation field information may be incorporated in the image signal by allotting some lines of data of the image signal for storing the prospective irradiation field information. In this case, when two lines, 2000 picture elements (8 bits/picture element), are allotted for storing the prospective irradiation field information, a storage area of 4000 bytes can be ensured. Parameters representing the prospective irradiation field information can be stored in the storage area. In this case, though the last two lines of the image signal become not effective, such an ineffectiveness at an edge of the image gives rise to no problem in diagnosis.

Other various methods employed in data transfer can be employed in "transferring the prospective irradiation field information attached to the radiation image signal".

The image processing to make the image in the prospective irradiation field more suitable for viewing may be "off-field darkening processing" described above, that is, an image processing for lowering the brightness of the area outside the irradiation field when a visible image is displayed, for instance, on a CRT, or an image processing for increasing the density of the area outside the irradiation field when a visible image is recorded on film. Further the image processing may be an image processing for cutting or shading off the area outside the irradiation field.

According to whether the output radiation image is acceptable, the prospective irradiation field information may be corrected on the receiver side if necessary, i.e., if the output radiation image is not acceptable. When the prospective irradiation field information is corrected, an image processing to make the image in the prospective irradiation field more suitable for viewing may be carried out on the transferred image signal on the basis of the corrected irradiation field information, and when the prospective irradiation field information is not corrected, an image processing to make the image in the prospective irradiation field more suitable for viewing may be carried out on the transferred image signal on the basis of the transferred prospective irradiation field information. Then a visible image is output on the basis of the processed image signal.

An operator, doctor or the like on the receiver side views the radiation image output on the basis of the image signal processed on the basis of the prospective irradiation field information as transferred and determines whether the output radiation image is acceptable, that is, whether the prospective irradiation field information as transferred designates a proper area. When it is determined that the prospective irradiation field information as transferred designates an improper area, the prospective irradiation field information is corrected and otherwise need not be corrected.

To correct the prospective irradiation field information means to change the size, shape, number and the like of the prospective irradiation field(s). For example, when correction information that the prospective irradiation field should be of a rectangle (circle, ellipsoid or the like) and the number of the irradiation fields should be 0 (1, 2, 4 . . . ) is given by the receiver side, the prospective irradiation field information is corrected on the transmitter side or the receiver side according to an algorithm suitable for a predetermined correction conforming to the correction information and the corrected prospective irradiation field is output on the receiver side. In this case, to input the correction information representing that the number of the irradiation field is 0 and correct the prospective irradiation field information according to the correction information is to take it that there exists no irradiation field and process the whole image signal without carrying out an image processing on the basis of the irradiation field. Accordingly, in such a case, instruction for stopping the image processing on the basis of the prospective irradiation field may be directly input in place of the correction information representing that the number of the irradiation field is 0.

Operators designating a prospective irradiation field using an input means such as a mouse, a touch pen or the like viewing a radiation image displayed on a monitor should also be considered to be an operation of giving the correction information.

In accordance with a second aspect of the present invention there is provided a system for processing a radiation image which processes a radiation image according to the method of the first aspect. That is, the system of the second aspect comprises an image information obtaining section which obtains an image signal representing a radiation image and a prospective irradiation field information representing a prospective irradiation field of the radiation image, an image output section which comprises an image processing means which carries out an image processing to make an image in the prospective irradiation field more suitable for viewing on the transferred image signal on the basis of the prospective irradiation field information transferred and an image output means which outputs a radiation image on the basis of the processed image signal and a transfer means which transfers the prospective irradiation field information attached to the radiation image signal or separately therefrom to the image output section from the image information obtaining section.

As the image output means, an image display means such as a CRT, an image recording means such as a laser printer which records an image on a photosensitive recording medium, and the like can be employed.

Each or one of the image information obtaining section and the image output section may have a correction means for correcting the prospective irradiation field information according to a predetermined correction information and the image output section may be further provided with a correction information input means which receives a predetermined correction information and outputs it to the corrections means so that the image processing means carries out the image processing, to make the image in the prospective irradiation field more suitable for viewing, on the transferred image signal on the basis of the corrected prospective irradiation field information when the prospective irradiation field information is corrected and on the basis of the transferred prospective irradiation field information when the prospective irradiation field information is not corrected.

In the method of and the system for processing a radiation image of the first and second aspects of the present invention, a radiation image is output on the receiver side on the basis of an image signal which has been processed on the basis of the prospective irradiation field information. In contrast, in the method of and the system for processing a radiation image of third and fourth aspects of the present invention, the radiation image is output on the basis of an image signal simply synthesized with a prospective irradiation field information and the image processing is carried out after the prospective irradiation field information is corrected according to the result of the synthesis.

That is, in accordance with the third aspect of the present invention, there is provided a method of processing a radiation image comprising the steps of obtaining an image signal representing a radiation image and a prospective irradiation field information representing a prospective irradiation field of the radiation image, transferring the prospective irradiation field information attached to the radiation image signal or separately therefrom to an image output section, and synthesizing the transferred image signal with the transferred prospective irradiation field information and outputting a radiation image on the basis of the image signal synthesized with the prospective irradiation field information in the output section.

That is, since an image in which a line pattern representing the prospective irradiation field overlaps the radiation image is output, the arrangement, shape, number and the like of the prospective irradiation field(s) can be clearly judged.

Then the prospective irradiation field information may be corrected on the receiver side according to the judgment. When the prospective irradiation field information is corrected, an image processing to make the image in the prospective irradiation field more suitable for viewing may be carried out on the transferred image signal on the basis of the corrected irradiation field information, and when the prospective irradiation field information is not corrected, an image processing to make the image in the prospective irradiation field more suitable for viewing may be carried out on the transferred image signal on the basis of the transferred prospective irradiation field information.

In accordance with the fourth aspect of the present invention there is provided a system for processing a radiation image which processes a radiation image according to the method of the third aspect. That is, the system of the fourth aspect comprises an image information obtaining section which obtains an image signal representing a radiation image and a prospective irradiation field information representing a prospective irradiation field of the radiation image, an image output section which comprises an image processing means which synthesizes the image signal with the prospective irradiation field information and an image output means which outputs a radiation image on the basis of the image signal synthesized with the prospective irradiation field information and a transfer means which transfers the prospective irradiation field information attached to the radiation image signal or separately therefrom to the image output section from the image information obtaining section.

Each or one of the image information obtaining section and the image output section may have a correction means for correcting the prospective irradiation field information according to a predetermined correction information and the image output section may be further provided with a correction information input means which receives a predetermined correction information and outputs it to the corrections means so that the image processing means carries out the image processing, to make the image in the prospective irradiation field more suitable for viewing, on the transferred image signal on the basis of the corrected prospective irradiation field information when the prospective irradiation field information is corrected and on the basis of the transferred prospective irradiation field information when the prospective irradiation field information is not corrected.

In accordance with the present invention, the prospective irradiation field information is transferred to the output side (the receiver side or the image output section) together with the image signal and the image processing to make the image in the prospective irradiation field more suitable for viewing is carried out on the output side. Accordingly the output side can hold the original image signal (the image signal before it is processed) and for instance, when the transferred prospective irradiation field information is not proper due to, for instance, improper irradiation field recognition processing carried out on the transmitter side (the image information obtaining side), the receiver side can quickly output a radiation image on the basis of the original image signal.

When the prospective irradiation field information is incorporated in the radiation image signal as a part thereof, the amount of data to be transferred is kept equal to that when only the image signal is transferred. Further in the case of an image output section having function of image processing or image synthesis, the prospective irradiation field information in the transferred image signal is recognized and an image processing or image synthesis is carried out on the basis of the prospective irradiation field information. In the case of an image output section not having such function, the prospective irradiation field information in the transferred image signal is ignored and a radiation image is output on the basis of the transferred image signal bearing thereon the prospective irradiation field information. Accordingly, the present invention can be applied to existing system by changing only a part thereof, whereby the introduction cost can be suppressed.

In the method and system in accordance with the third and fourth aspects of the present invention, since an image in which a line pattern representing the prospective irradiation field overlaps the radiation image is output, the state of the prospective irradiation field (the arrangement, shape, number and the like of the prospective irradiation field(s)) in the entire radiation image can be viewed and accordingly whether the prospective irradiation field is proper can be more clearly judged.

Further in the systems and the methods in accordance with the present invention, when the prospective irradiation field information is corrected according to whether the output radiation image is acceptable, not only a radiation image can be output on the basis of the original image signal, that is, the image signal before the image processing or the image synthesis, but also a radiation image which is properly processed on the basis of the corrected prospective irradiation field information can be obtained in a short time on the receiver side.

Further when the aforesaid off-field darkening processing is employed as the image processing based on the prospective irradiation field information, the output image can be more suitable for diagnosis since the image in the irradiation field is not affected by the image outside the irradiation field.

DESCRIPTION OF THE PREFERRED EMBODIMENTS

Figure 1:
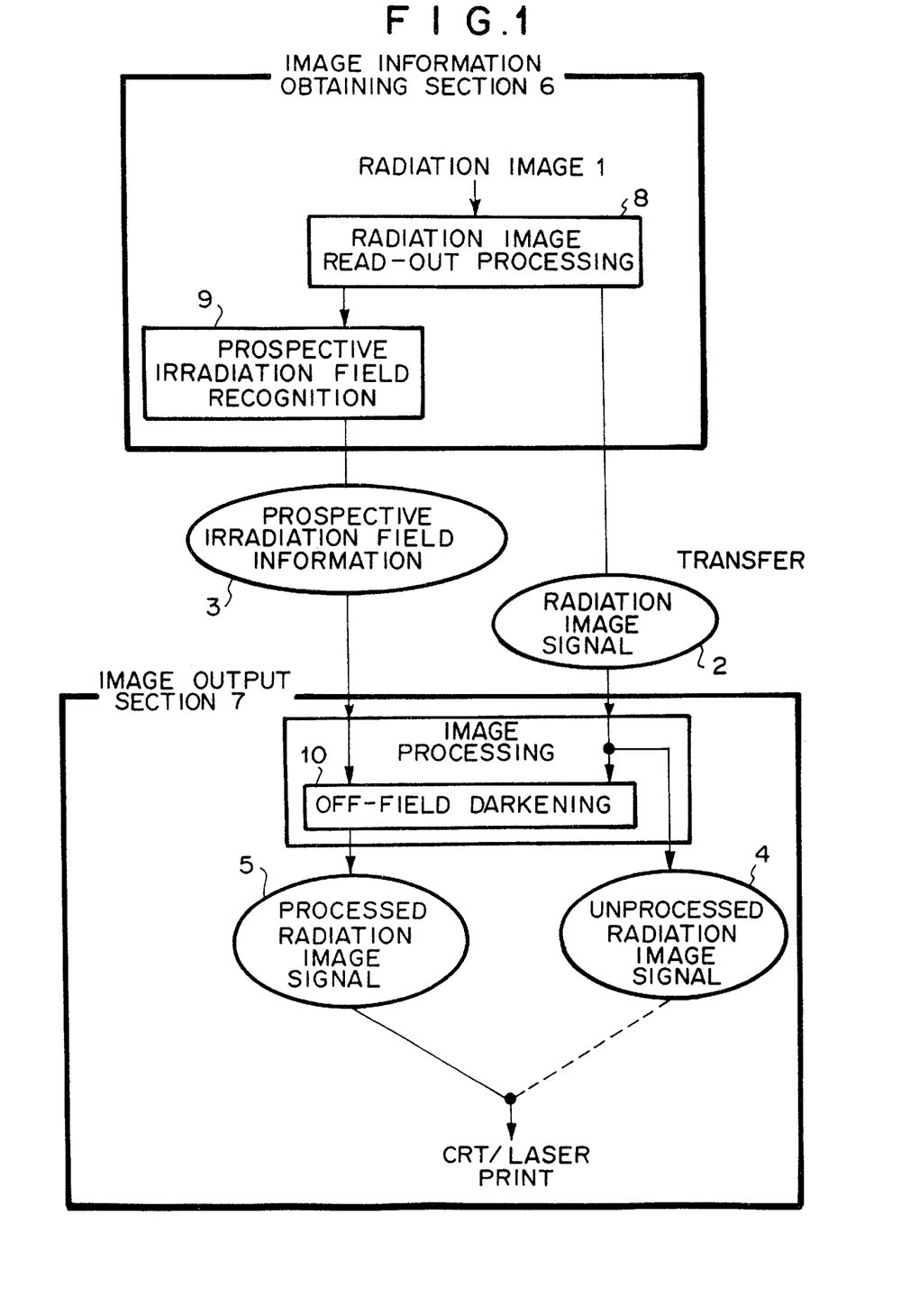
FIG. 1 is a view for illustrating processing and flow of data in a method and a system in accordance with an embodiment of the present invention.

In FIG. 1, each rectangular and each ellipsoid show processing and data in a method of and a system for processing a radiation image in accordance with an embodiment of the present invention. Each processing may be executed either separately by an exclusive means or together with other processing by a common means. For example, a prospective irradiation field obtaining processing may be executed as a processing in a series of processings executed by an image processing system though a radiation image read-out processing is executed by one read-out system.

In FIG. 1, an image information obtaining section 6 comprises an image taking means, an image read-out means, an image recognition means and the like and generates a radiation image signal and image information related to the image signal. However this arrangement is only an example and the image information obtaining section 6 need not be provided with an image taking means and/or an image readout means provided that the image information obtaining section 6 is provided with at least an image recognition processing means which carries out an image recognition (prospective irradiation field recognition) processing on a radiation image signal input into the image information obtaining section 6.

An image output section 7 outputs a visible image on the basis of processed image signal from a CRT, a laser printer or the like through an image processing means. The method and the system in accordance with the present invention is based on an assumption that the radiation image signal 2 is transferred from the image information obtaining section 6 to the image output section 7 through a transfer means such as a network, and accordingly is more useful when the image information obtaining section 6 and the image output section 7 are at a relatively large distance from each other.

A radiation image 1 taken with the irradiation field limited is read out and a digital image signal 2 representing the radiation image 1 is obtained through a radiation image read-out processing 8. A prospective irradiation field recognition processing 9, e.g., an image recognition processing by an irradiation field recognition method disclosed in U.S. Pat. No. 4,967,079, is carried out on the digital image signal 2, whereby a prospective irradiation field information 3 is obtained. The prospective irradiation field information 3 may be information representing the prospective irradiation field itself or that representing the boundary between the area inside the prospective irradiation field and the area outside the same (the edge of the prospective irradiation field). The method of representing the prospective irradiation field or the data format of the same need not be limited to a particular format may be of various formats such bit map data. However in view of the transfer speed and/or load on the network, it is preferred that the prospective irradiation field information 3 be represented in the form of data as small as possible.

The prospective irradiation field information 3 is attached to the image signal 2 and is transferred to the image output section 7 by a transfer means. Examples of the method of attaching the prospective irradiation field information 3 to the image signal 2 will be described with reference to FIGS. 2 and 3, though it need not be limited to such methods.

Figure 2:
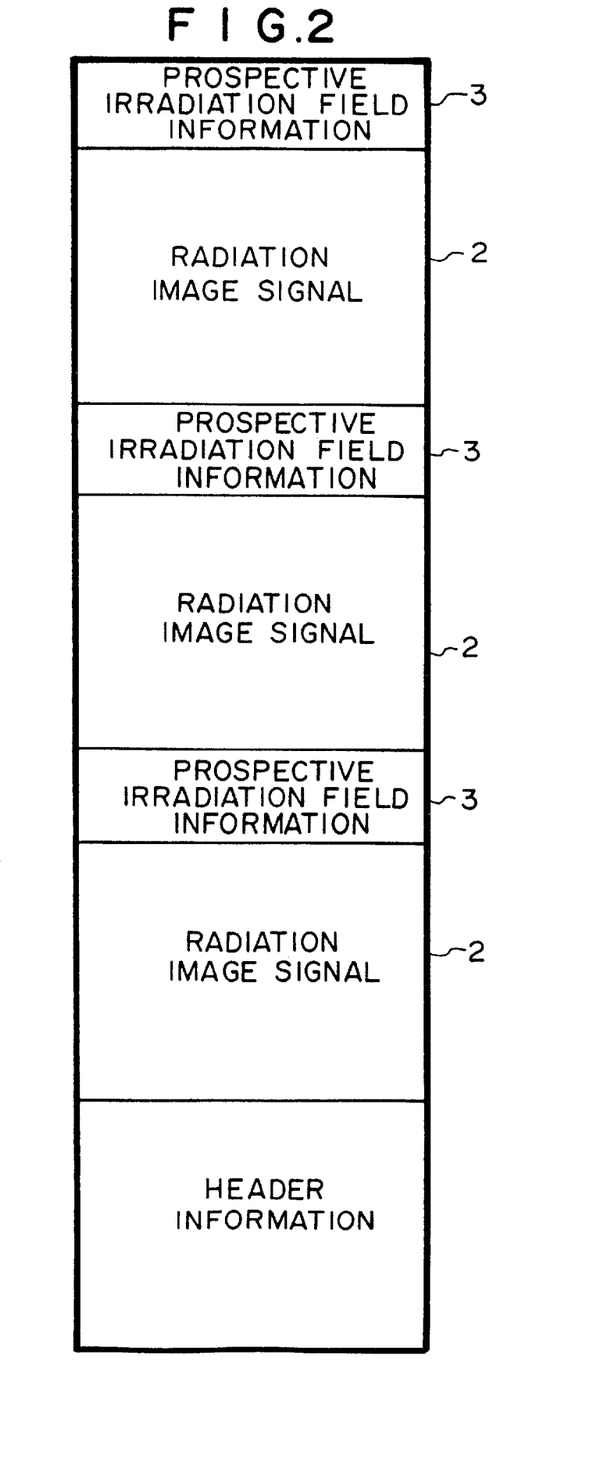
FIG. 2 is a view for illustrating an example of a method for attaching the prospective irradiation field information to the radiation image signal.
Figure 3:
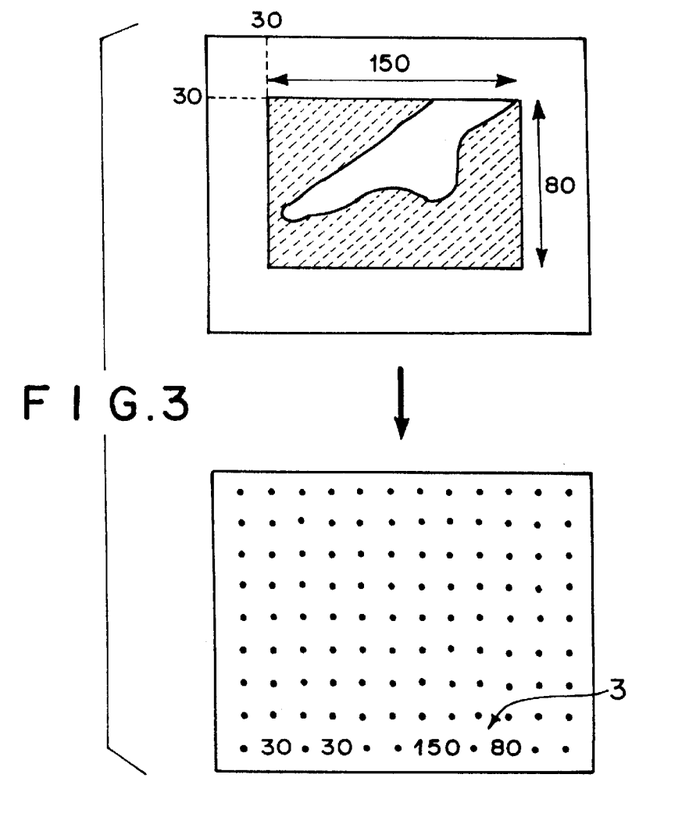
FIG. 3 is a view for illustrating another example of a method for attaching the prospective irradiation field information to the radiation image signal.

FIG. 2 shows data transferred to the image output section 7 from image information obtaining section 6. In this example, a transfer header is attached to three radiation image signals and the three radiation image signals are transferred as a data set. As shown in FIG. 3, each radiation image signal 2 is accompanied by prospective irradiation field information 3 for the image signal 2. This method is advantageous in that the data processing is easy. However when the image output section is of a conventional type which does not have a function of separating the prospective irradiation field information from the radiation image signal, the image output section recognizes the prospective irradiation field information 3 as a radiation image signal 2. Accordingly all the image output sections in the system must be of a type having the function required in the present invention.

Since the actual radiation image recording and reproducing system generally includes many display systems such as a CRT, the cost for replacing or modifying all the image output systems to conform to the present invention is substantial.

The method shown in FIG. 3 is free from such drawbacks. In this method, the prospective irradiation field information 3 is incorporated in the image signal 2 by allotting some lines of data of the image signal 2 for storing the prospective irradiation field information 3. In this case, though the part of the image signal on the lines allotted for storing the prospective irradiation field information 3 is lost and data ineffective as an image is output in place of such data, it gives rise to no problem so long as the part is not a part which largely affects the quality of the output image.

The image output section 7 correctly recognizes the prospective irradiation field information 3 incorporated in the image signal 2 as a part thereof and carries out an image processing such as the aforesaid off-field darkening processing on the image signal 2 on the basis of the prospective irradiation field information 3.

When the image output section 7 does not conform to the method of the present invention, the part of the output corresponding to the prospective irradiation field information 3 becomes uneffective but a visible image acceptable for viewing as a whole can be output.

When the prospective irradiation field information 3 is incorporated in the image signal 2 by allotting some lines of data of the image signal 2 for storing the prospective irradiation field information 3, it is preferred that the prospective irradiation field information be stored in the form of data as small as possible. In the example shown in FIG. 3, a rectangular prospective irradiation field is represented by the coordinates of the upper left corner and the horizontal and vertical dimensions of the irradiation field. When the prospective irradiation field information is represented in such a data format, the prospective irradiation field information can be incorporated in an area of several ten bytes to several kilobytes. As the data format for the prospective irradiation field information, various other formats such as those in which the edge of the prospective irradiation field is represented by a plurality of points and lines joining the points (so-called vector data) may be employed.

Now referring to FIG. 1 again, the processing to be carried out in the image output section 7 upon receipt of the radiation image signal and the prospective irradiation field information attached thereto will be described. In this particular embodiment, the off-field darkening processing 10 is carried out on the radiation image signal 2 and the processed radiation image signal 5 is output as a visible image by a CRT, laser printer or the like. At this time, the radiation image signal 2 is not deleted but stored as an unprocessed radiation image signal 4.

Here it is assumed that the prospective irradiation field information 3 is not proper due to some abnormality in the prospective irradiation field recognition processing 9 in the image information obtaining section 6. This results in darkening a part of the radiation image necessary for diagnosis. In such a case, conventionally the prospective irradiation field recognition processing 9 and the processing following the processing 9 must be done again since the image output section holds only the processed radiation image signal.

In contrast, in the case of the system of this embodiment, since the image output section 7 holds the unprocessed image signal 4, i.e., the radiation image signal before it is processed, a radiation image released from the off-field darkening processing can be output, whereby a radiation image including the part which will be darkened if the radiation image signal 2 is subjected to the off-field darkening processing on the basis of the transferred prospective irradiation field information 4 can be viewed though the quality of the image is not so suitable for diagnosis. That is, according to an instruction of the operator of the image output section 7, the radiation image output on the basis of the processed image signal 5 can be switched to that output on the basis of the unprocessed image signal 4.

Figure 4:
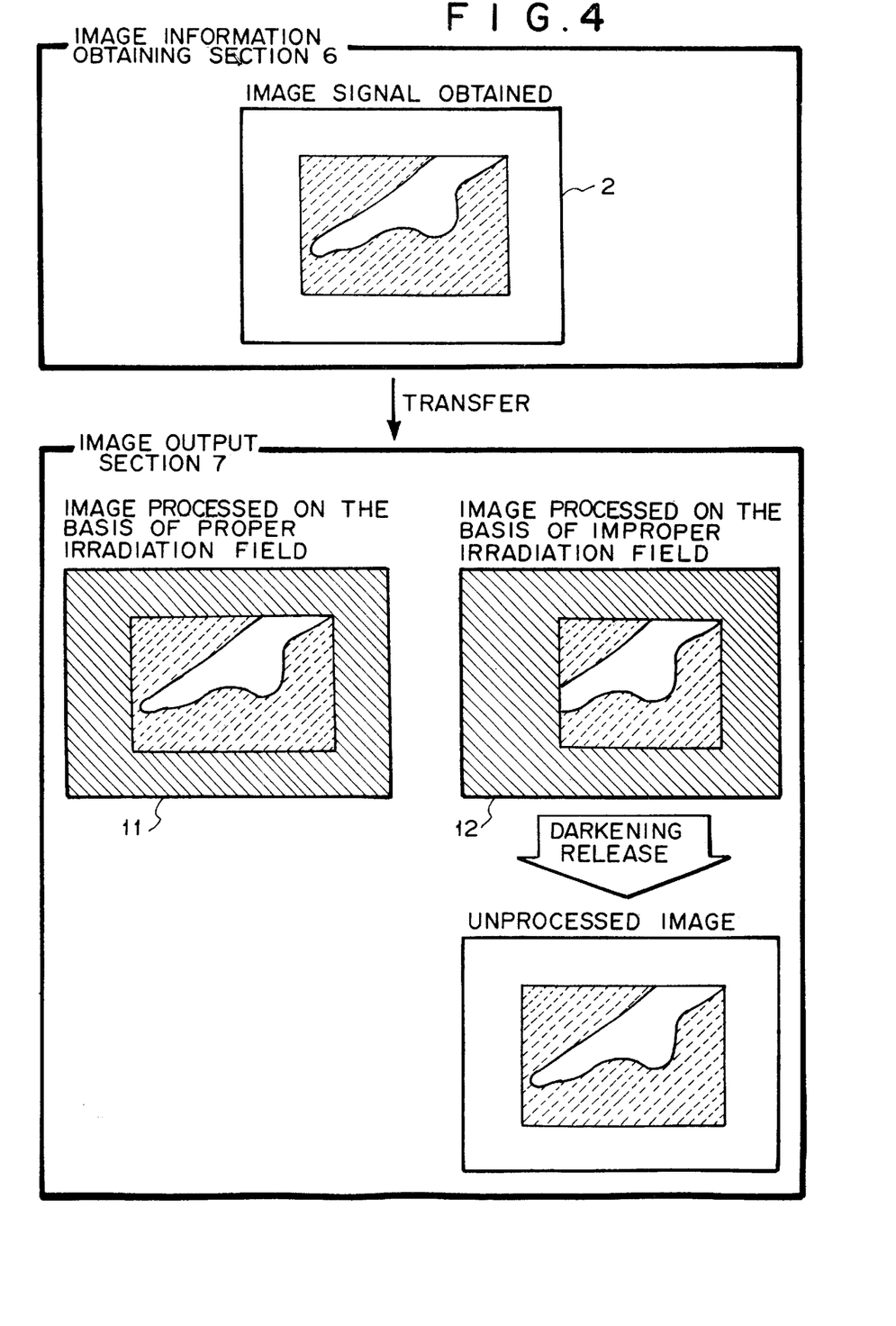
FIG. 4 is a view for illustrating the effect of the method and the system described shown in FIG. 1.

FIG. 4 is a view for illustrating the aforesaid operation of the system of this embodiment in conjunction with a specific radiation image which is actually output. For example, when the radiation image signal 2 obtained in the image information obtaining section 6 is such as represents a radiation image shown in FIG. 4 and has an irradiation field shown there, the radiation image output from the image output section 7 on the basis of the processed image signal 5 should be like an output image 11. When the prospective irradiation field information 3 transferred to the image output section 7 is not correct, the radiation image output from the image output section 7 on the basis of the processed image signal 5 can be like an output image 12. In such a case, a radiation image released from the off-field darkening processing can be output as shown below the output image 12.

The image processing to make the image in the prospective irradiation field more suitable for viewing may be various processings other than the off-field darkening processing. For example, a processing of extracting only the image inside the irradiation field and output it, a processing of extracting the images inside the irradiation fields of a plurality of radiation images and outputting the extracted images side by side as a unit image on a display or film and the like can be employed. All of such processings should be interpreted to be within the spirit and scope of the present invention.

As can be understood from the description above, in the radiation image processing system of this embodiment, even if the prospective irradiation field recognized on the transmitter side is improper, the image processing on the basis of the improper prospective irradiation field information can be cancelled and a radiation image free from an irradiation field, which is of a higher quality as compared with a radiation image processed on the basis of the improper prospective irradiation field information, can be output at once on the receiver side (on a terminal level in the network).

Though, in the embodiment described above, a radiation image is output on the receiver side on the basis of an image signal which has been processed on the basis of the prospective irradiation field information, the radiation image may be output on the basis of an image signal simply synthesized with a prospective irradiation field information.

Figure 5:
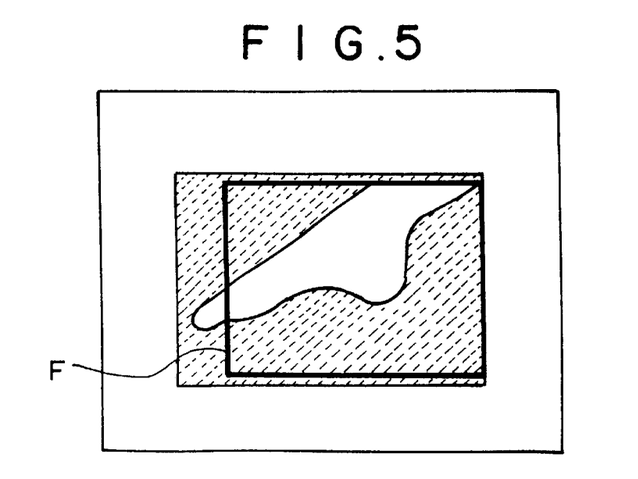
FIG. 5 is a view for illustrating a method and a system in accordance with another embodiment of the present invention.

In such a case, a radiation image in which a line pattern representing the prospective irradiation field overlaps the radiation image is output as shown in FIG. 5, in which line F shows the prospective irradiation field represented by the transferred prospective irradiation field information 3, and accordingly the state of the prospective irradiation field (the arrangement, shape, number and the like of the prospective irradiation field(s)) in the entire radiation image can be viewed and accordingly whether the prospective irradiation field is proper can be more clearly judged.

Though, in the embodiment described above, the prospective irradiation field information is transferred from the image information obtaining section to the image output section attached to the radiation image signal, the prospective irradiation field information may be transferred to the image output section separately from the radiation image signal. In this case, the radiation image signal may be transferred to the image output section either from the image information obtaining section or from an external system such as a memory.

A system for processing a radiation image in accordance with another embodiment of the present invention will be described with reference to FIGS. 6 and 7, hereinbelow. The radiation image processing system 100 of this embodiment comprises an image information obtaining section 20 which receives a radiation image signal representing a radiation image from an external radiation image read-out system (a computed radiography) 220, a computed tomography 300, a magnetic resonance imaging system 400 or the like and is provided with an irradiation field recognition processing means 21 which obtains a prospective irradiation field information representing a prospective irradiation field from the radiation image signal, a filing section 30 which stores the prospective irradiation field information and the radiation image signal with relation to each other, an image output section 40 which is provided with an image processing means 41 which carries out an off-field darkening processing to make the image in the prospective irradiation field more suitable for viewing on the basis of the prospective irradiation field information and the radiation image signal input from the image information obtaining section 20, an image output means 42 such as a CRT which outputs a radiation image on the basis of the processed radiation image signal, a correction information input means 43 through which a correction information for correcting the prospective irradiation field information is input, and a correction means 44 which corrects the prospective irradiation field information on the basis of the correction information input through the correction information input means 43, and a transfer means 50 which transfers the prospective irradiation field information attached to the radiation image signal or separately therefrom to the image output section 40 from the image information obtaining section 20.

When the correction means 44 corrects the transferred prospective irradiation field information, the image processing means 41 carries out the off-field darkening processing on the basis of the corrected prospective irradiation field information and otherwise the image processing means 41 carries out the off-field darkening processing on the basis of the prospective irradiation field information as transferred.

Figure 7:
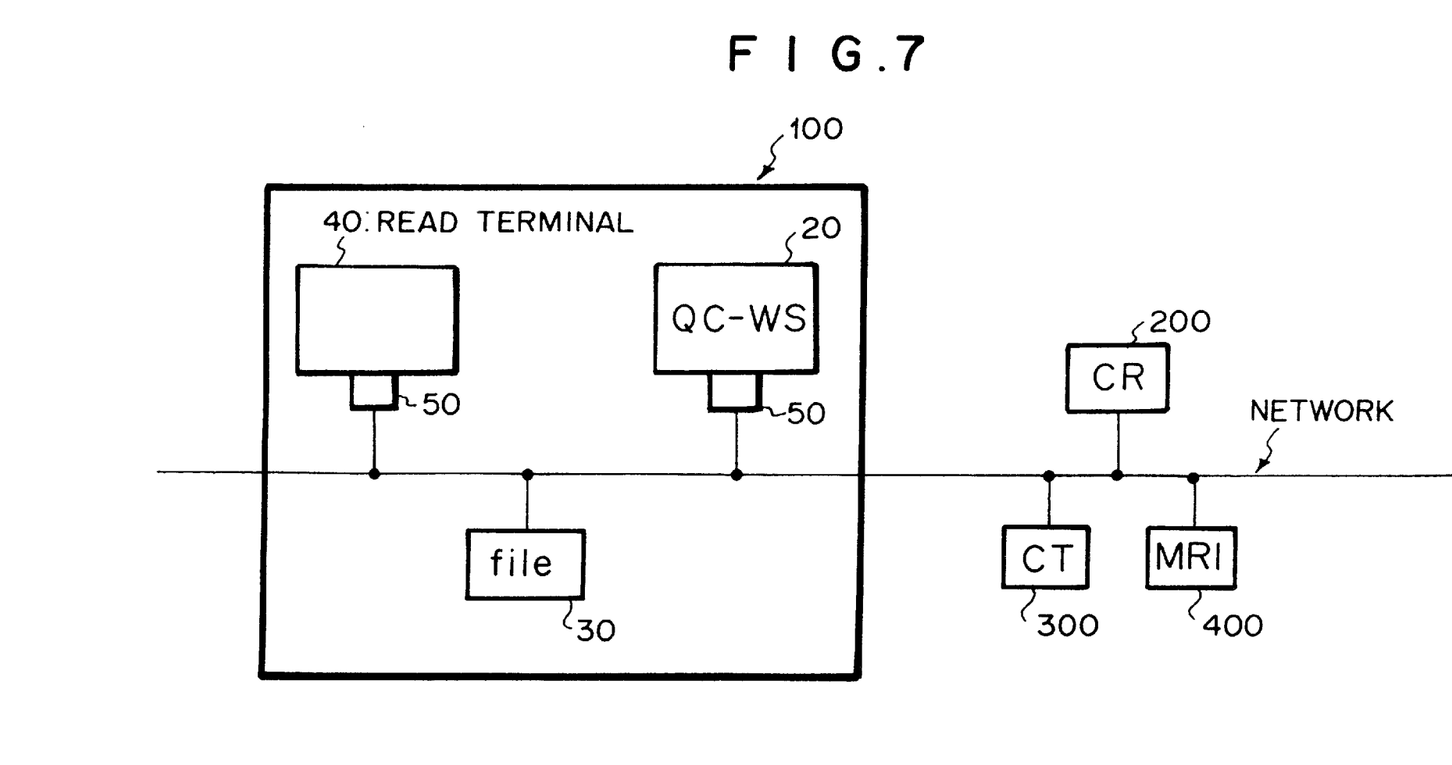
FIG. 7 is a view showing a network including the system shown in FIG. 6.

The radiation image processing system 100 of this embodiment forms a part of a network shown in FIG. 7. In the network, a QC-WS (quality control workstation) 20 corresponds to the image information obtaining section 20 and a read terminal 40 corresponds to the image output section 40.

The processing for recognizing the irradiation field carried out by the irradiation field recognition processing means 21 is a processing for automatically detecting a prospective irradiation field which is carried out on the image signal according to a predetermined algorithm. For example, a processing disclosed in U.S. Pat. No. 4,967,079 in which prospective edge points are detected on the basis of differences between image signal components and a prospective edge is detected on the basis of the prospective edge points, a dynamic contour extraction processing using Snakes algorithm, and other various known processings may be employed.

The off-field darkening processing carried out by the image processing means 41 is a processing for uniformly converting the brightness or the density of the picture elements outside the prospective irradiation field to a minimum brightness or a maximum density.

The correction information input into the correction information input means 43 is information which is useful to re-specify the prospective irradiation field such as the shape of the irradiation field (rectangle (circle, elipsoid or the like), the number of the irradiation fields (0, 1, 2, 4 . . . ) and the like. When the prospective irradiation field in the radiation image output by the image output means 42 need not be corrected, information representing that the prospective irradiation field need not be corrected should also be considered as correction information.

Correction of the prospective irradiation field by the correction means 44 is to change the size, shape, number and the like of the prospective irradiation field represented by the prospective irradiation field information stored in the filing section 30 on the basis of the correction information input into the correction information input means 43.

The operation of the radiation image processing system 100 of this embodiment will be described, hereinbelow.

When a radiation image signal representing a radiation image taken by the computed radiography system 200 or the like in the network is input into the image information obtaining section 20, the image information obtaining section 20 thereby obtains a radiation image signal and at the same time the irradiation field recognition processing means 21 detects a prospective irradiation field of the radiation image on the basis of the radiation image signal.

Prospective irradiation field information representing the prospective irradiation field detected by the irradiation field recognition processing means 21 is attached to the radiation image signal and is transferred to the image output section 40 and the filing section 30 by the transfer means 50.

The filing section 30 stores the prospective irradiation field information and the radiation image signal with relation to each other.

In the image output section 40, the image processing means 41 recognizes the prospective irradiation field information attached to the radiation image signal input from the image information obtaining section 20 and carries out an off-field darkening processing on the radiation image signal on the basis of the prospective irradiation field information obtained.

A radiation image with its area outside the prospective irradiation field darkened is displayed as a visible image by the image output means 42.

Here a doctor or the like views the visible image and when the prospective irradiation field in the visible image is improper, e.g., when the prospective irradiation field is smaller than the actual irradiation field, the doctor inputs a correction information, which is known information useful for correcting the prospective irradiation field, into the correction information input means 43. For example, the correction information may be input by selecting suitable information from a plurality of sets of correction information hierarchically displayed on a CRT or the like. When the doctor or the like determines that the transferred prospective irradiation field information is proper, correction information representing that the prospective irradiation field need not be corrected is input into the correction information input means 43. In place of inputting correction information representing that the prospective irradiation field need not be corrected, it is possible to treat the fact that no correction information is input within a predetermined time after the visible image is output by the image output means 42 as meaning that the prospective irradiation field need not be corrected.

The correction information input into the correction information input means 43 is input into the correction means 44. The correction means 44 reads out the prospective irradiation field information stored in the filing section 30 and corrects the prospective irradiation field information on the basis of the correction information input.

Then the image processing means 41 carries out an off-field darkening processing on the radiation image signal on the basis of the corrected prospective irradiation field information.

Then a radiation image with its area outside the corrected prospective irradiation field darkened is displayed as a visible image by the image output means 42.

On the other hand, when the doctor or the like determines that the transferred prospective irradiation field information need not be corrected and correction information representing that the prospective irradiation field need not be corrected is input into the correction information input means 43, the correction means 44 does not correct the transferred prospective irradiation field information, and the image processing means 41 carries out an off-field darkening processing on the basis of the prospective irradiation field information as transferred. Then a radiation image with its area outside the prospective irradiation field darkened is displayed as a visible image by the image output means 42.

Thus in this embodiment, not only the off-field darkening processing is simply released according to whether the output radiation image is acceptable as in the embodiment shown in FIG. 1, but also a radiation image can be output at once on the output side on the basis of the radiation image signal processed on the basis of the corrected prospective irradiation field information.

Though, in the embodiment described above, the correction means is an element of the image output section, the image information obtaining section may be provided with such a correction means or both the image output section and the image information obtaining section may be provided with such correction means.

Figure 6:
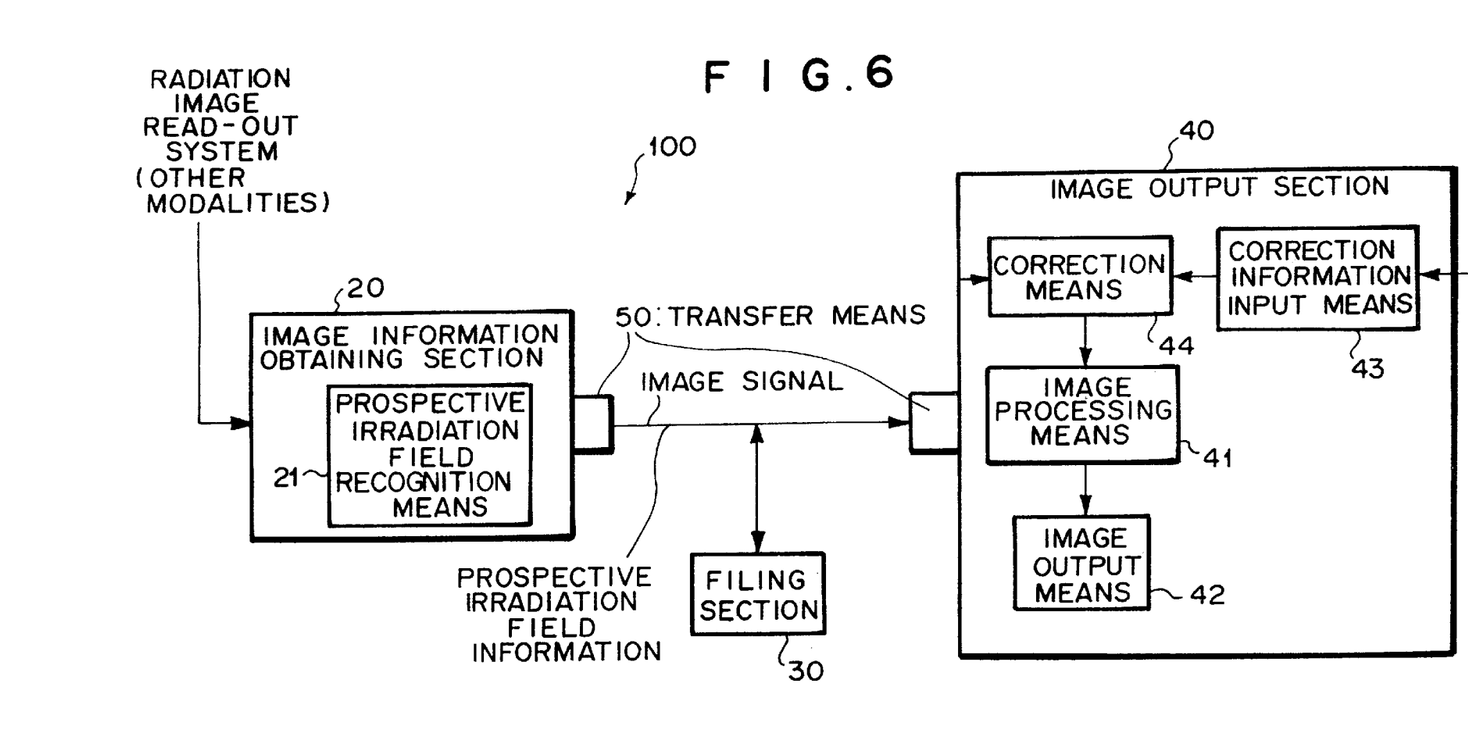
FIG. 6 is a view showing an arrangement of a system in accordance with still another embodiment of the present invention.

Further in the embodiment shown in FIGS. 6 and 7, the image processing means 41 carries out an off-field darkening processing on the radiation image signal from the first image processing thereof. However there may be used a different image processing means which simply synthesizes the prospective irradiation field information with the radiation image signal in the first image processing and carries out an off-field darkening processing on the radiation image signal on the basis of the corrected prospective irradiation field information when the transferred prospective irradiation field information is corrected and otherwise on the basis of the prospective irradiation field information as transferred.

Further an irradiation field recognized by the operator viewing the radiation image output by the image output means 42 may be input through a mouse, touch pen, touch panel, tablet or the like may be input as the correction information.

What is claimed is:

1. A method of processing a radiation image comprising the steps of:
   obtaining an image signal representing a radiation image and a prospective irradiation field information representing a prospective irradiation field of the radiation image, wherein said prospective irradiation field information is information which distinguishes an area inside a detected irradiation field from an area outside said detected irradiation field;
   transferring the prospective irradiation field information attached to the radiation image signal or separately therefrom to an image output section;
   carrying out an image processing to make the image in the prospective irradiation field more suitable for viewing on the transferred image signal in the image output section on the basis of the transferred prospective irradiation field information; and
   outputting a radiation image on the basis of the processed mage signal.

2. A method of processing a radiation image as defined in claim 1 further comprising the steps of:
   correcting the prospective irradiation field information in the image output section if necessary according to whether the output radiation image is acceptable;
   carrying out an image processing to make the image in the prospective irradiation field more suitable for viewing on the transferred image signal on the basis of the corrected irradiation field information when the prospective irradiation field information if corrected, and on the basis of the prospective irradiation field information as transferred when the prospective irradiation field information is not corrected; and
   outputting a radiation image on the basis of the processed image signal.

3. A method of processing a radiation image as defined in claim 1 in which said image processing to make the image in the prospective irradiation field more suitable for viewing is an image processing for lowering the brightness of the area outside the irradiation field or increasing the density of the area outside the prospective f irradiation field.

4. A method of processing a radiation image as defined in claim 1 in which said prospective irradiation field information is attached to the radiation image signal by incorporating the former in the latter as a part of the latter.

5. A method of processing a radiation image comprising the steps of:
   obtaining an image signal representing a radiation image and a prospective irradiation field information representing a prospective irradiation field of the radiation image, wherein said prospective irradiation field information is information which distinguishes an area inside a detected irradiation field from an area outside said detected irradiation field;
   transferring the prospective irradiation field information attached to the radiation image signal or separately therefrom to an image output section; and
   synthesizing the transferred image signal with the transferred prospective irradiation field information and outputting a radiation image on the basis of the image signal synthesized with the prospective irradiation field information in the output section.

6. A method of processing a radiation image as defined in claim 5 further comprising the steps of:
   correcting the prospective irradiation field information in the image output section if necessary according to whether the output radiation image is acceptable;
   carrying out an image processing to make the image in the prospective irradiation field more suitable for viewing on the transferred image signal on the basis of the corrected irradiation field information when the prospective irradiation field information if corrected, and on the basis of the prospective irradiation field information as transferred when the prospective irradiation field information is not corrected; and
   outputting a radiation image on the basis of the processed image signal.

7. A method of processing a radiation image as defined in claim 5 in which said image processing to make the image in the prospective irradiation field more suitable for viewing is an image processing for lowering the brightness of the area outside the irradiation field or increasing the density of the area outside the prospective irradiation field.

8. A method of processing a radiation image as defined in claim 5 in which said prospective irradiation field information is attached to the radiation image signal by incorporating the former in the latter as a part of the latter.

9. A system for processing a radiation image comprising:

an image information obtaining section which obtains an image signal representing a radiation image and a prospective irradiation field information representing a prospective radiation field of the radiation image, wherein said prospective irradiation field information is information which distinguishes an area inside a detected irradiation field from an area outside said detected irradiation field;

an image output section which comprises an image processing means which carries out an image processing to make an image in the prospective radiation field more suitable for viewing on the transferred image signal on the basis of the prospective irradiation field information transferred and an image output means which outputs a radiation image on the basis of the processed image signal; and a transfer means which transfers the prospective irradiation field information attached to the radiation image signal or separately therefrom to the image output section from the image information obtaining section.

10. A system for processing a radiation image as defined in claim 9 in which the image information obtaining section and/or the image output section are provided with a correction means for correcting the prospective irradiation field information according to predetermined correction information;

the image output section is further provided with a correction information input means which receives the predetermined correction information and outputs it to the correction means; and the image processing means carries out said image processing on the transferred image signal on the basis of the corrected prospective irradiation field information when the prospective irradiation field information if corrected and on the basis of the prospective irradiation field information as transferred when the prospective irradiation field information is not corrected.

11. A system for processing a radiation image as defined in claim 9 in which said image processing is an image processing for lowering the brightness of the area outside the irradiation field or increasing the density of the area outside the prospective irradiation field.

12. A system for processing a radiation image as defined in claim 9 in which said prospective irradiation field information is attached to the radiation image signal by incorporating the former in the latter as a part of the latter.

13. A system for processing a radiation image comprising:

an image information obtaining section which obtains an image signal representing a radiation image and a prospective irradiation field information representing a prospective irradiation field of the radiation image, wherein said prospective irradiation field information is information which distinguishes an area inside a detected irradiation field from an area outside said detected irradiation field;

an image output section which comprises an image processing means which synthesizes the image signal with the prospective irradiation field information and an image output means which outputs a radiation image on the basis of the image signal synthesized with the prospective irradiation field information; and a transfer means which transfers the prospective irradiation field information attached to the radiation image signal or separately therefrom to the image output section from the image information obtaining system.

14. A system for processing a radiation image as defined in claim 13 in which the image information obtaining section and/or the image output section are provided with a correction means for correcting the prospective irradiation field information according to predetermined correction information;

the image output section is further provided with a correction information input means which receives the predetermined correction information and outputs it to the correction means; and the image processing means carries out said image processing on the transferred image signal on the basis of the corrected prospective irradiation field information when the prospective irradiation field information if corrected and on the basis of the prospective irradiation field information as transferred when the prospective irradiation field information is not corrected.

15. A system for processing a radiation image as defined in claim 13 in which said image processing is an image processing for lowering the brightness of the area outside the irradiation field or increasing the density of the area outside the prospective irradiation field.

16. A system for processing a radiation image as defined in claim 13 in which said prospective irradiation field information is attached to the radiation image signal by incorporating the former in the latter as a part of the latter.

* * * * *